M. GROVER.
Plow.
No. 18,335.
Patented Oct. 6, 1857.
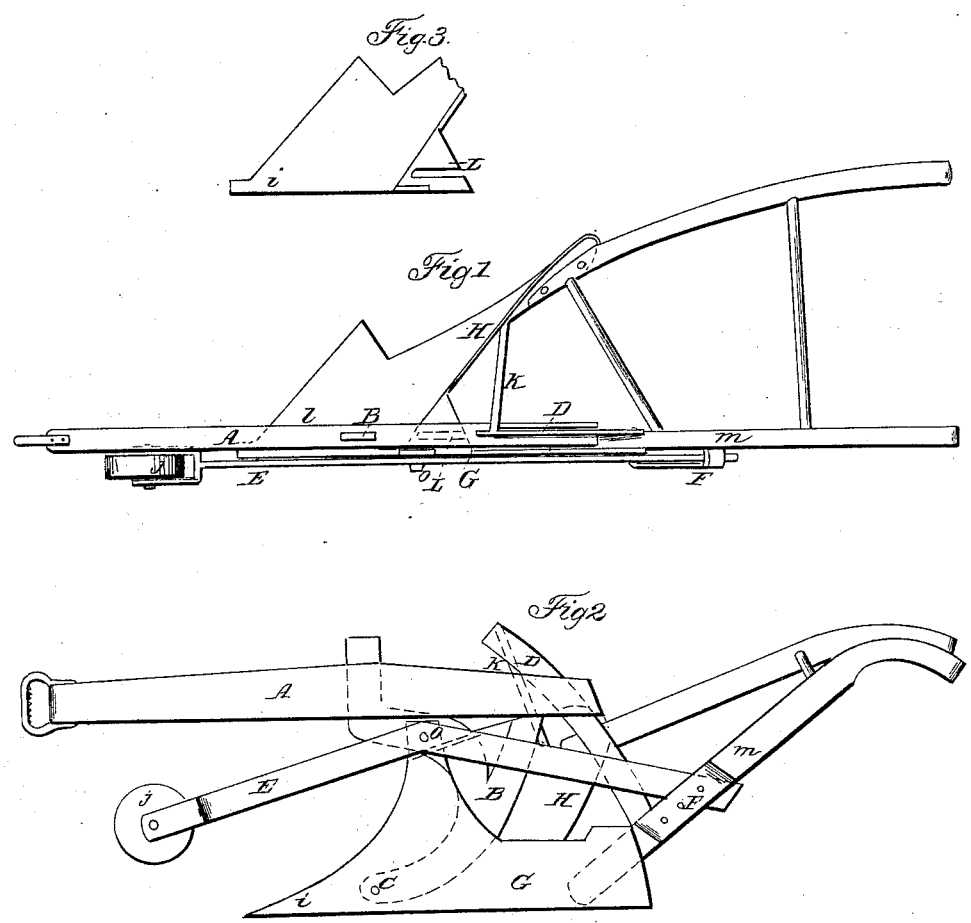

UNITED STATES PATENT OFFICE.

MANASSEH GROVER, OF CLYDE, OHIO.

IMPROVEMENT IN PLOWS.

Specification forming part of Letters Patent No. 18,335, dated October 6, 1857.

*To all whom it may concern:*

Be it known that I, MANASSEH GROVER, of Clyde, in the county of Sandusky and State of Ohio, have invented a new and useful Improvement in Plows; and I do hereby declare the following to be a full and exact description of the same, reference being had to the annexed drawings, forming part of this specification, in which—

Figure 1 is a top view of the plow. Fig. 2 is an elevation of the same. Fig. 3 is a detached view representing the slotted piece L.

Similar letters denote the same parts.

The nature of my invention consists in constructing plows in such a manner as when in the act of plowing to ascend and descend freely, corresponding with the surface of the earth, plowing a uniform depth, however uneven it may be, without any exertion being made by the person using it to produce such an effect, while at the same time the beam keeps its same or relative position, the remainder of the plow being allowed to act or work up or down freely on a hinged joint, made for that purpose nearly at the bottom and on the inside of the plow by reason of a forked bar extending from the said hinged joint up to the beam of the plow and fastened firmly to it, and being so arranged and constructed as not to be allowed to move or sway in a lateral direction.

The depth of plowing is gaged by a roller or wheel placed immediately in front of the plow, which works in the forward end of a lever, said lever extending from the roller to the landside-handle, and has its fulcrum nearly in the center of the upper part and outer side of the plow.

To enable others skilled in the art to make and use my invention, I will proceed to describe its construction and operation.

I construct my plow in the usual form, with the exception of the beam and a few variations, which will readily be understood by the following description and accompanying drawings.

In the drawings, A is the beam, with the forked bar B fastened firmly to it, and is placed above the plow. The forked bar B extends down on the inside of the plow, between the landside G and mold-board H, nearly to the bottom of the plow, and is fastened or attached to it in the form or position of a hinge-joint, C, or its equivalent, for the purpose of allowing the plow when in operation to move in an upward or downward direction corresponding with the surface of the earth, plowing a uniform depth, however uneven it may be, and consequently leaving the beam A and the forked bar B remaining in the same position.

The upper end of the forked bar B, just below the beam A, works in a slot, L, as represented in the drawings. The back or rear end of the beam has a slot for the segment-bar D to pass through, working backward and forward freely, as occasion may require it, to prevent the back end of the beam from moving or swaying laterally. The segment-bar D is fastened at its lower end to the landside-handle M, and has its upper end fastened to the upper end of a cross-bar, K, the other end of cross-bar K being fastened to mold-board H, as represented in Fig. 1.

The roller or wheel J is fastened to and works in one end of a lever, E, which lever has its fulcrum at pivot O, and extends from the roller to a slot, F, in plow-handle M, and by reason of a series of holes in said slot the said lever to which the roller is attached is rendered adjustable.

What I claim as my invention, and desire to secure by Letters Patent, is—

The combination of hinged forked bar B and beam A with the segmental bar D and the adjustable lever E, with its roller J, the whole arranged and operating substantially as and for the purpose hereinbefore set forth.

In testimony whereof I have hereunto signed my name before two subscribing witnesses.

MANASSEH GROVER.

Witnesses:
JAS. D. CLARY,
W. CROSSFIELD.